(12) United States Patent
Cameron

(10) Patent No.: US 11,529,678 B2
(45) Date of Patent: Dec. 20, 2022

(54) SYSTEM AND METHOD FOR ENCAPSULATING A WORKPIECE

(71) Applicant: PRATT & WHITNEY CANADA CORP., Longueuil (CA)

(72) Inventor: Maurice Cameron, Halifax (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 14 days.

(21) Appl. No.: 16/898,498

(22) Filed: Jun. 11, 2020

(65) Prior Publication Data
US 2021/0387252 A1    Dec. 16, 2021

(51) Int. Cl.
| | |
|---|---|
| *B22D 19/00* | (2006.01) |
| *B22D 30/00* | (2006.01) |
| *B22D 47/00* | (2006.01) |
| *B22D 17/20* | (2006.01) |
| *B22D 17/32* | (2006.01) |

(52) U.S. Cl.
CPC ............ *B22D 19/00* (2013.01); *B22D 17/20* (2013.01); *B22D 17/32* (2013.01); *B22D 30/00* (2013.01); *B22D 47/00* (2013.01)

(58) Field of Classification Search
CPC ........ B22D 30/00; B22D 47/00; B23Q 11/10; F25B 9/04
See application file for complete search history.

(56) References Cited

U.S. PATENT DOCUMENTS

| | | | | |
|---|---|---|---|---|
| 4,409,718 | A | * | 10/1983 | Pryor ................... B22D 46/00 29/407.04 |
| 8,810,644 | B2 | | 8/2014 | Bunker et al. |
| 9,417,624 | B2 | | 8/2016 | Bellerose et al. |
| 2005/0238461 | A1 | | 12/2005 | Ouellette et al. |
| 2012/0211193 | A1 | * | 8/2012 | Bochiechio ............ B22D 17/30 164/512 |
| 2019/0344337 | A1 | | 11/2019 | Hetke |
| 2020/0086383 | A1 | * | 3/2020 | Bullied ................ B22D 11/143 |

FOREIGN PATENT DOCUMENTS

| | | | |
|---|---|---|---|
| GB | 2181374 | | 4/1987 |
| IT | 201800010508 | | 5/2020 |
| JP | 2007285685 A | * | 11/2007 ................ F25B 9/04 |

OTHER PUBLICATIONS https://www.nexflow.com/blog/vortex-tubes-use-compressed-air-generate-cold-hot-air-simultaneously/ (Year: 2018).*
Extended European Search Report, dated Oct. 15, 2021 in counterpart EP application No. 21178532.4.

* cited by examiner

*Primary Examiner* — Kevin E Yoon
(74) *Attorney, Agent, or Firm* — Norton Rose Fulbright Canada LLP

(57) ABSTRACT

The method can include: using a mold, casting an encapsulation onto a workpiece including solidifying the encapsulation around the workpiece in the mold and extracting the encapsulation from the mold, and cooling the extracted encapsulation using a vortex tube.

15 Claims, 9 Drawing Sheets

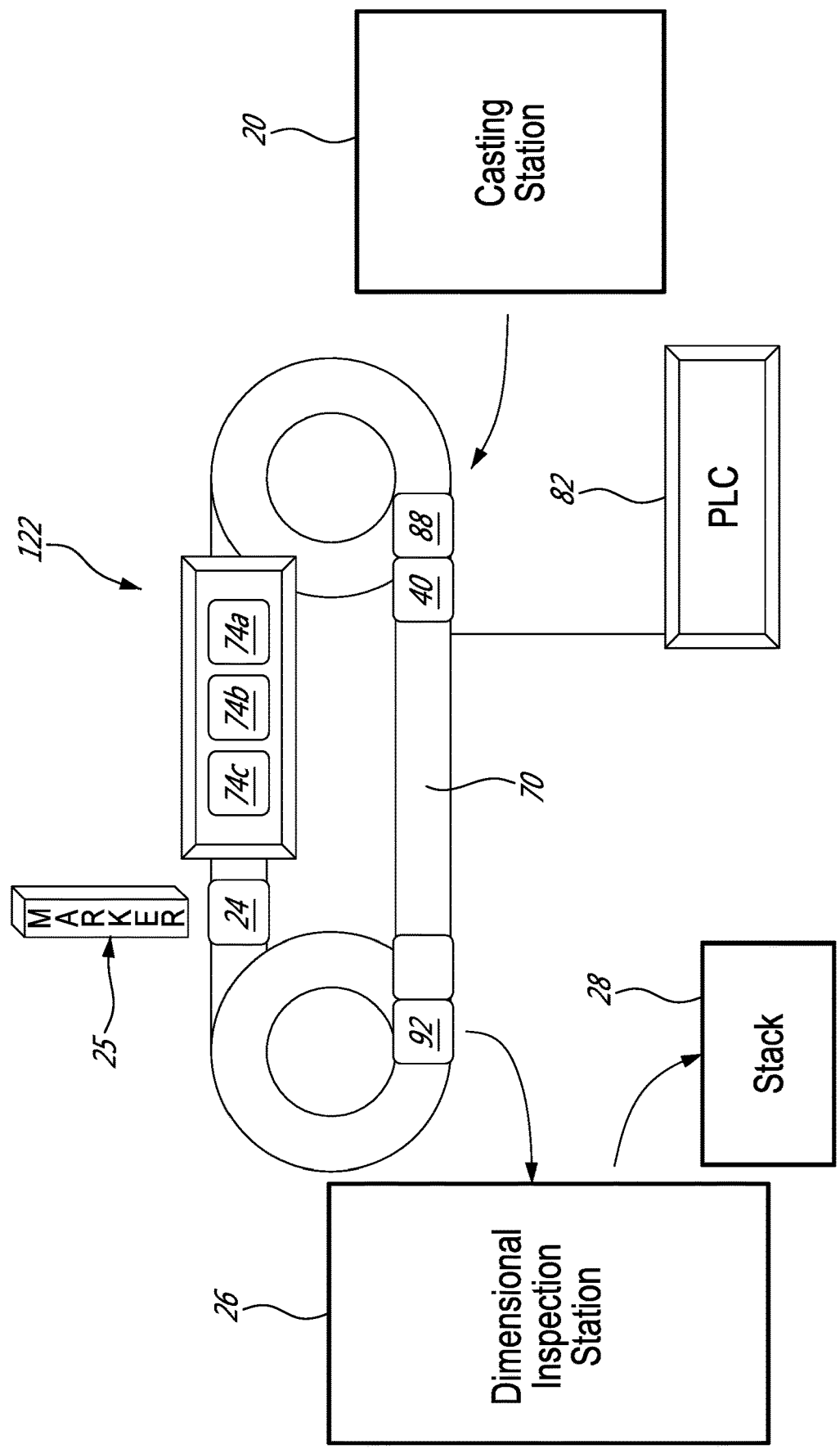

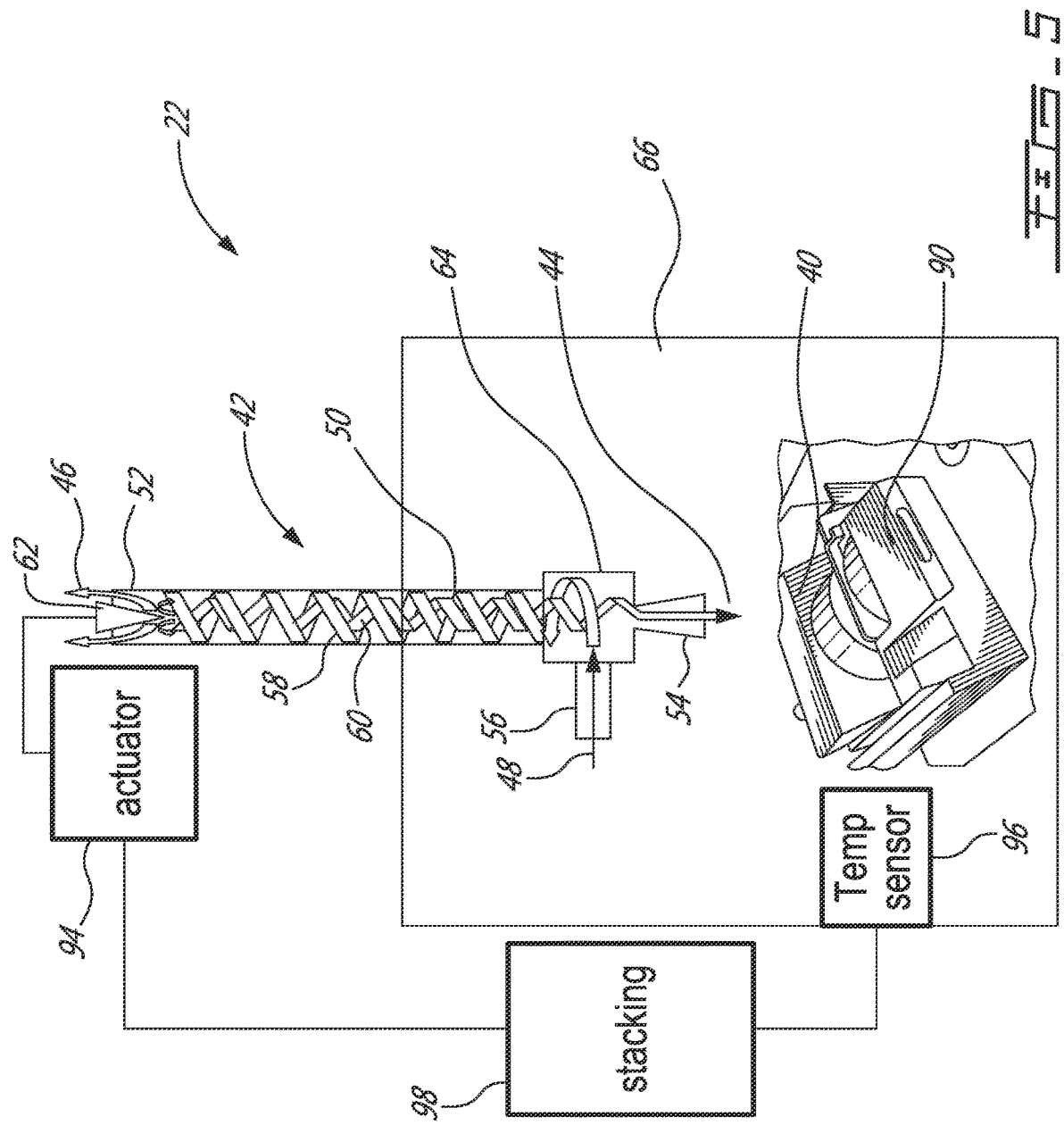

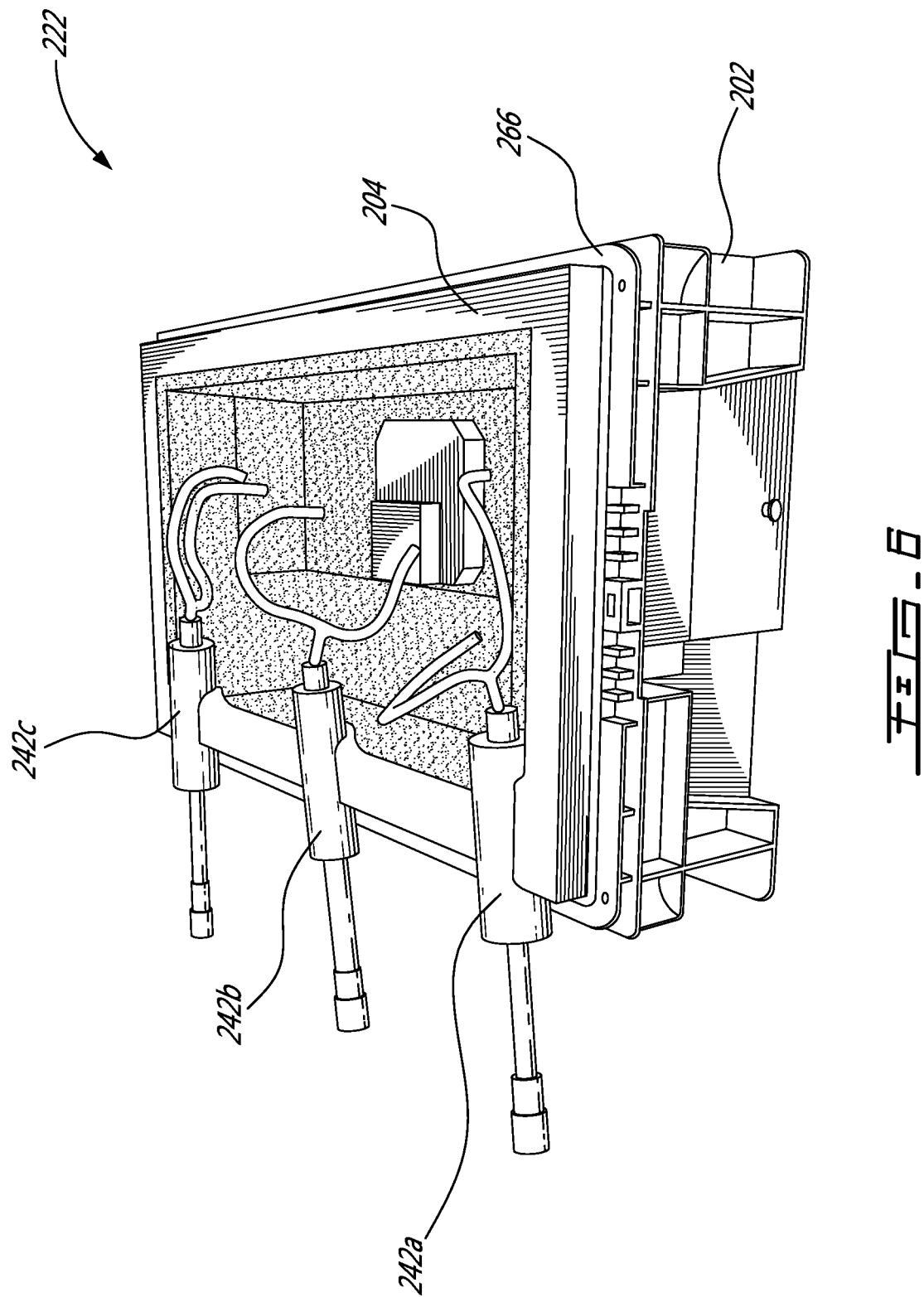

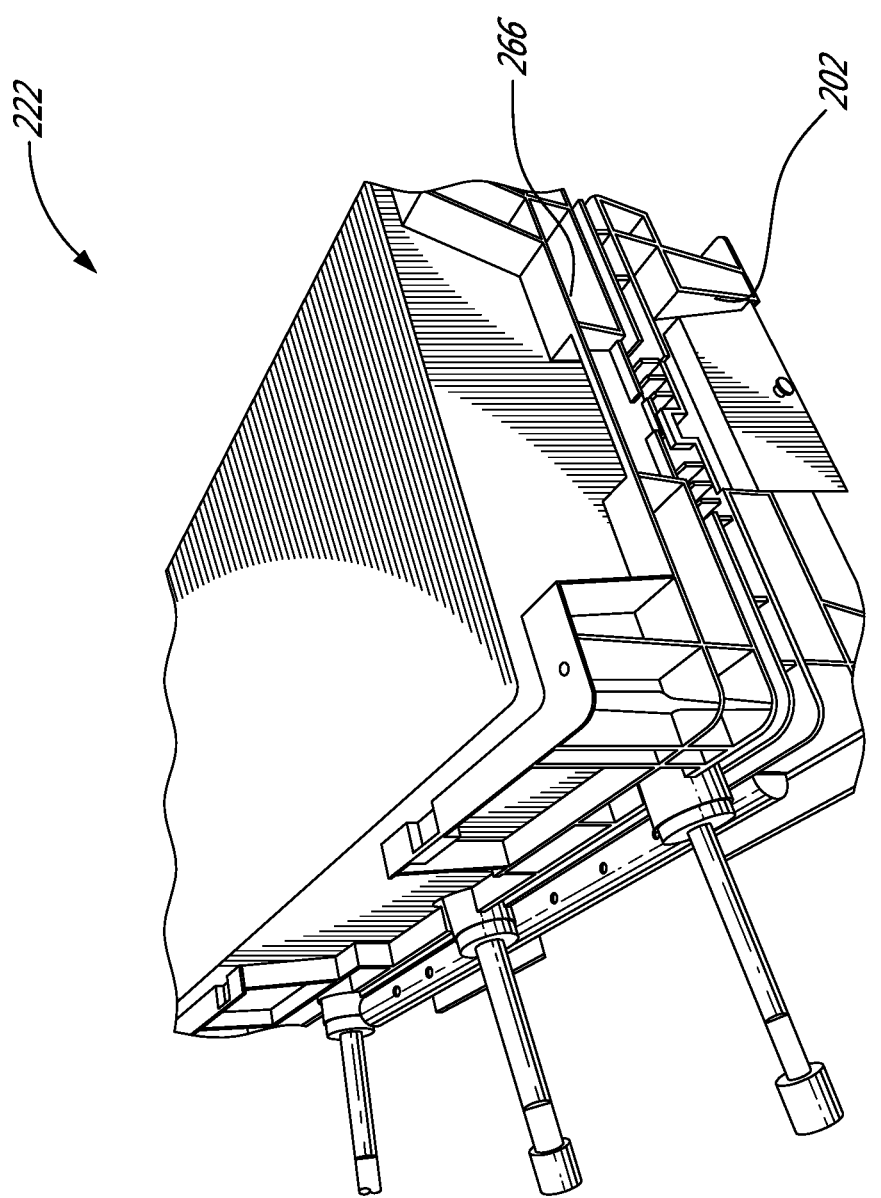

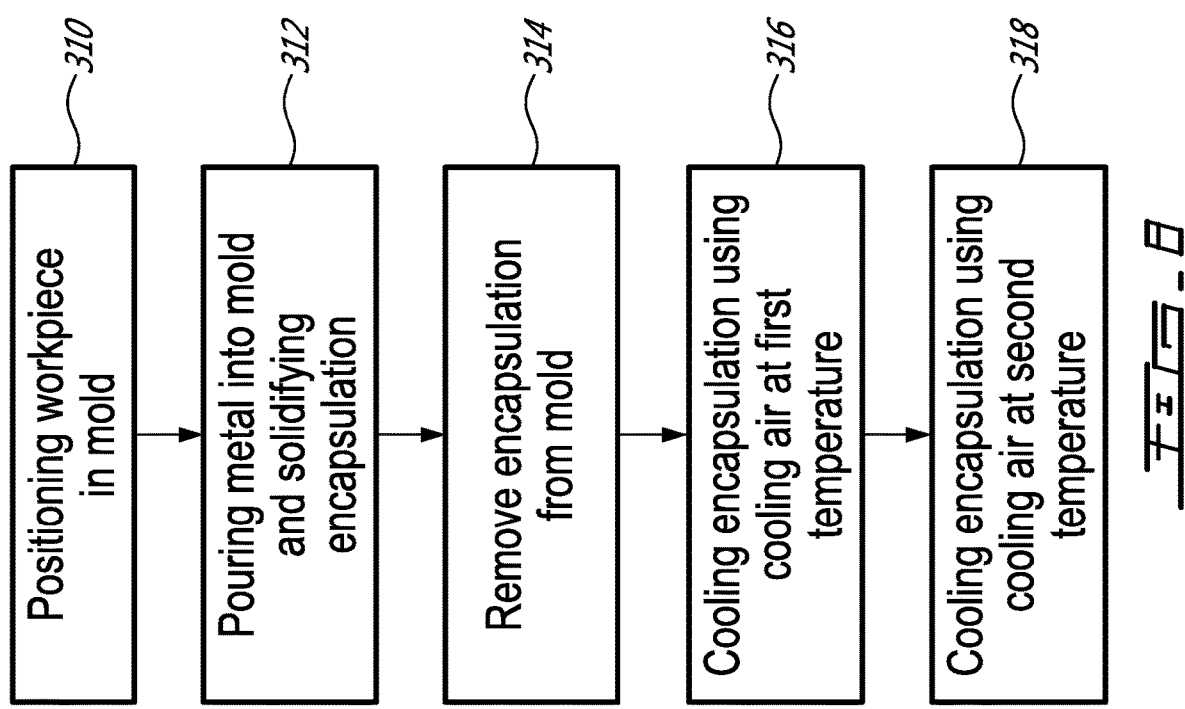

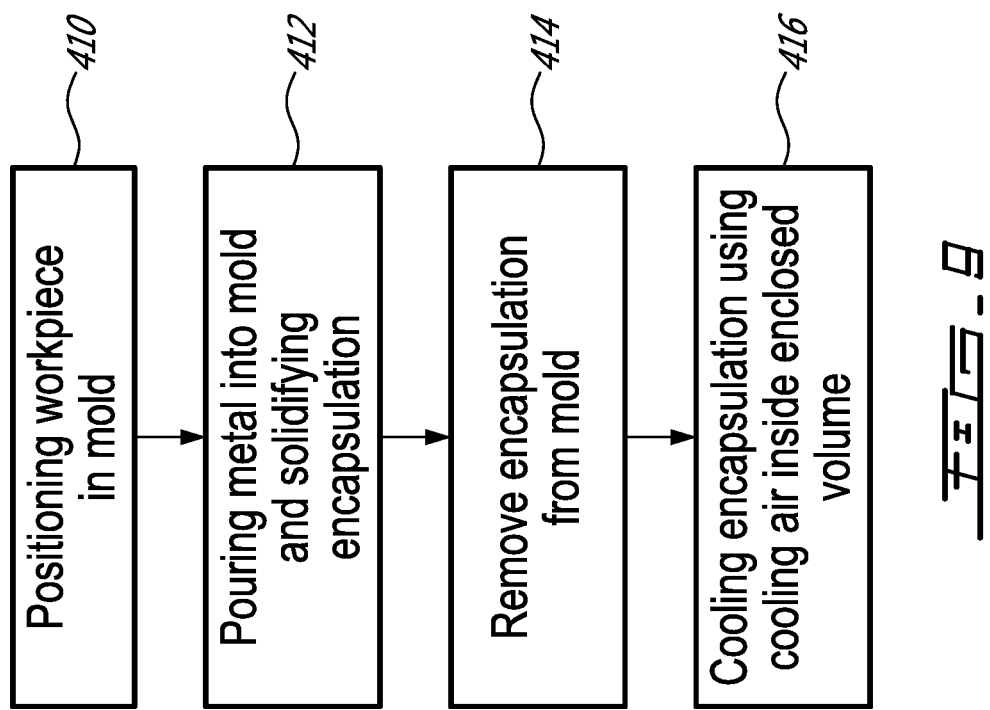

SYSTEM AND METHOD FOR ENCAPSULATING A WORKPIECE

TECHNICAL FIELD

The application relates generally to machining and, more particularly, to fixturing workpieces having complex geometries.

BACKGROUND OF THE ART

Fixturing refers to the way a workpiece is held during machining or measuring, and is part of many automated, semi-automated or manual machining and dimensional inspection processes such as turning, milling (e.g. via a computerized numerical command—CNC machine), coordinate-measuring (e.g. via a coordinate measuring machine—CMM) etc. Fixturing can meet significant challenges when the workpiece has a complex shape, such as an airfoil shape for instance. In some cases, it is simply not considered feasible or practical to fixture the workpiece itself with a satisfactory degree of precision or convenience, in which case the fixturing can be performed via an encapsulation.

Encapsulating refers to a casting of a mass of metal having a lower melting point and controlled, typically standardized, geometry onto the workpiece, within tight tolerances, in a manner that the workpiece can thereafter be held by the encapsulation, the latter being secured into the fixture. Encapsulation can be performed by pouring a suitable metal in liquid state into a mold in which the workpiece is partially or fully engaged. The mold can be referred to as an encapsulation die, but other expressions exist to refer to it.

The fixturing can take place close to where the encapsulation is performed, at a remote location in the same plant, or in another plant altogether, to name some examples. After the fixturing operation has been completed, independently of whether it was performed for machining, measuring, or any other reason, the encapsulation can be removed from the workpiece. The most practical way of removing an encapsulation from a workpiece can be to break it off, and specialized equipment can be designed to that effect.

Encapsulations can be performed using various metals, and to a certain extent, the melting point of the encapsulation metal can be a factor to consider. Lower melting points can be favored due to factors such as energy consumption and simplicity, but higher melting points may nonetheless be preferred due to other factors. For example, tin bismuth (Sn, Bi) allows can have a melting point around 150° C., tin zinc (Sn, Zn) alloys can have a melting point around 180° C., lead or lead alloys (Pb) can have a melting point around 300° C., and zinc or zinc alloys can have a melting point of 400° C. While the higher melting point of zinc may appear less preferable than the lower melting points of the other metals named above, it can remain preferred in some embodiments for various reasons, such as lower toxicity, and that it tends to slightly shrink, and keep a tight hold onto the workpiece, as it ages.

While encapsulation techniques were suitable to a certain degree, there always remains room for improvement.

SUMMARY

In one aspect, there is provided a system for encapsulating a workpiece, the system comprising: a casting station configured to cast an encapsulation around a workpiece; and a cooling station having an enclosure configured to receive the encapsulation and workpiece, and a vortex tube having a pressurized air inlet, a cool air outlet, and a hot air outlet, the cool air outlet being inside the enclosure.

In another aspect, there is provided a process of encapsulating a workpiece comprising: positioning at least a portion of a workpiece in a mold, pouring a metal in liquid state into the mold, and solidifying the metal into an encapsulation, the encapsulation encapsulating the workpiece, removing the encapsulation and workpiece from the mold, cooling the encapsulation using cooling air at a first air temperature and a first flow rate from a vortex tube, and cooling the encapsulation using cooling air at a second air temperature and a second flow rate from said a vortex tube, the second air temperature, and second flow rate being lower than the first air temperature and first flow rate. Cooling at said second air temperature can be performed in an enclosed volume having less than 15 times a volume of the encapsulation. The encapsulation can be conveyed from the first enclosure to the second enclosure. Cooling at said first air temperature and said cooling at said second air temperature can be performed at different first and second cooling areas. The encapsulation can be conveyed from the first cooling area to the second cooling area. The conveying can be performed contingent upon said encapsulation reaching a target temperature. The vortex tube can be adjusted from said first air temperature and said first flow rate to said second air temperature and said second flow rate. The temperature of the encapsulation can be measured, and said adjusting be performed based on the measured temperature of the encapsulation in a manner to lower the air temperature and flow rate as the temperature of the encapsulation decreases. At least one of said steps of cooling can include feeding pressurized air into a tangential inlet of said vortex tube in a manner to generate an external vortex flow propagating lengthwise along the vortex tube toward an annular hot air outlet, and an inner vortex flow propagating back from the hot air outlet, within the external vortex flow, to a cool air outlet, transferring heat from the inner vortex flow to the external vortex flow, and venting the cooling air from the cool air outlet. The steps of cooling can include removing at least 10 kJ of heat from said encapsulation and sustaining, with a single vortex tube, a cooling rate of at least 20 kJ/min during a period of at least 15 seconds. The steps of cooling can include bringing the temperature of the encapsulation down from 300° C. to 50° C. The steps of cooling can include bringing the temperature of the encapsulation down to below 25° C. Dimensional analysis of said encapsulation can be performed at ambient temperature, and the encapsulation can be stacked contingent upon positive results of said dimensional analysis. The workpiece can be fixtured via the encapsulation, the fixtured workpiece can be machined, and the encapsulation can be removed from the workpiece.

In another aspect, there is provided a process of encapsulating a workpiece comprising: positioning at least a portion of a workpiece in a mold, pouring a metal in liquid state into the mold, and solidifying the metal into an encapsulation, the encapsulation encapsulating the workpiece, removing the encapsulation and workpiece from the mold, cooling the encapsulation using cooling air from a vortex tube, including include enclosing the cooling air and the encapsulation in a volume having less than 40 times a volume of the encapsulation. The cooling air can be directed into the volume, toward the encapsulation. The cooling can include sustaining a swirling flow around the encapsulation. The cooling can be performed in at least two distinct steps, each cooling step being performed in a distinct cooling area. The first cooling area can be enclosed in a volume having less than 40 times the volume of the encapsulation and the second cooling area can be enclosed in a volume having less than 15 times the volume of the encapsulation. At least one of said steps of cooling can include feeding pressurized air into a tangential inlet of said vortex tube in a manner to generate an external vortex flow propagating lengthwise along the vortex tube toward an annular hot air outlet, and an inner vortex flow propagating back from the hot air outlet, within the external vortex flow, to a cool air outlet, transferring heat from the inner vortex flow to the external vortex flow, and venting the cooling air from the cool air outlet. The step of cooling can include removing at least 10 kJ of heat from said encapsulation and sustaining, with a single vortex tube, a cooling rate of at least 20 kJ/min during a period of at least 15 seconds. The steps of cooling can include bringing the temperature of the encapsulation down from 300° C. to 50° C. The steps of cooling can include bringing the temperature of the encapsulation down to below 25° C. Dimensional analysis of said encapsulation can be performed at ambient temperature, and the encapsulation can be stacked contingent upon positive results of said dimensional analysis. The workpiece can be fixtured via the encapsulation, the fixtured workpiece can be machined, and the encapsulation can then be removed from the workpiece.

In accordance with another aspect, there is provided a process of encapsulating a workpiece comprising: positioning at least a portion of a workpiece in a mold, pouring a metal in liquid state into the mold, and solidifying the metal into an encapsulation, the encapsulation encapsulating the workpiece, removing the encapsulation and workpiece from the mold, cooling the encapsulation using cooling air from a vortex tube including removing at least 10 kJ of heat from said encapsulation and sustaining, with a single vortex tube, a cooling rate of at least 20 kJ/min during a period of at least 15 seconds.

In accordance with another aspect, there is provided a fixturing process comprising: positioning at least a portion of a workpiece in a mold, pouring a metal in liquid state into the mold, and solidifying the metal into an encapsulation, the encapsulation encapsulating the workpiece, removing the encapsulation from the mold, cooling the encapsulation using cooling air from at least one vortex tube, fixturing the workpiece via the cooled encapsulation, and removing the encapsulation from the workpiece.

The cooling can be performed in at least two distinct cooling stages including a first stage in which the encapsulation is cooled from a first temperature to a second temperature with at least one first vortex tube generating air at a first flow rate and a first temperature, and a second stage in which the encapsulation is cooled from the second temperature to a third temperature with at least one second vortex tube generating air at a second flow rate and a second temperature, wherein the second flow rate is lower than the first flow rate and the second temperature is lower than the first temperature.

In a further aspect, there is provided a process of manufacturing a turbine blade comprising: casting an encapsulation onto a preform of the turbine blade in a mold, including solidifying the encapsulation around the workpiece in the mold, extracting the encapsulation from the mold, and cooling the encapsulation using a vortex tube, fixturing the turbine blade preform via the encapsulation, machining the turbine blade preform into the turbine blade, and removing the encapsulation.

In a further aspect, there is provided: using a mold, casting an encapsulation onto a workpiece including solidifying the encapsulation around the workpiece in the mold and extracting the encapsulation from the mold, and cooling the extracted encapsulation using a vortex tube.

DESCRIPTION OF THE DRAWINGS

Reference is now made to the accompanying figures in which:

FIG. 4 is a top plan view of the example cooling station of FIG. 3;

FIG. 5 is a cross-sectional view of a second example cooling station;

FIGS. 6 and 7 are oblique views of a third example cooling station, open and closed, respectively;

FIG. 8 is a flowchart of an example process of encapsulating a workpiece, using cooling air at a first temperature and at a second temperature; and FIG. 9 is a flowchart of an example process of encapsulating a workpiece, using cooling air inside an enclosed volume.

DETAILED DESCRIPTION

Figure 1:
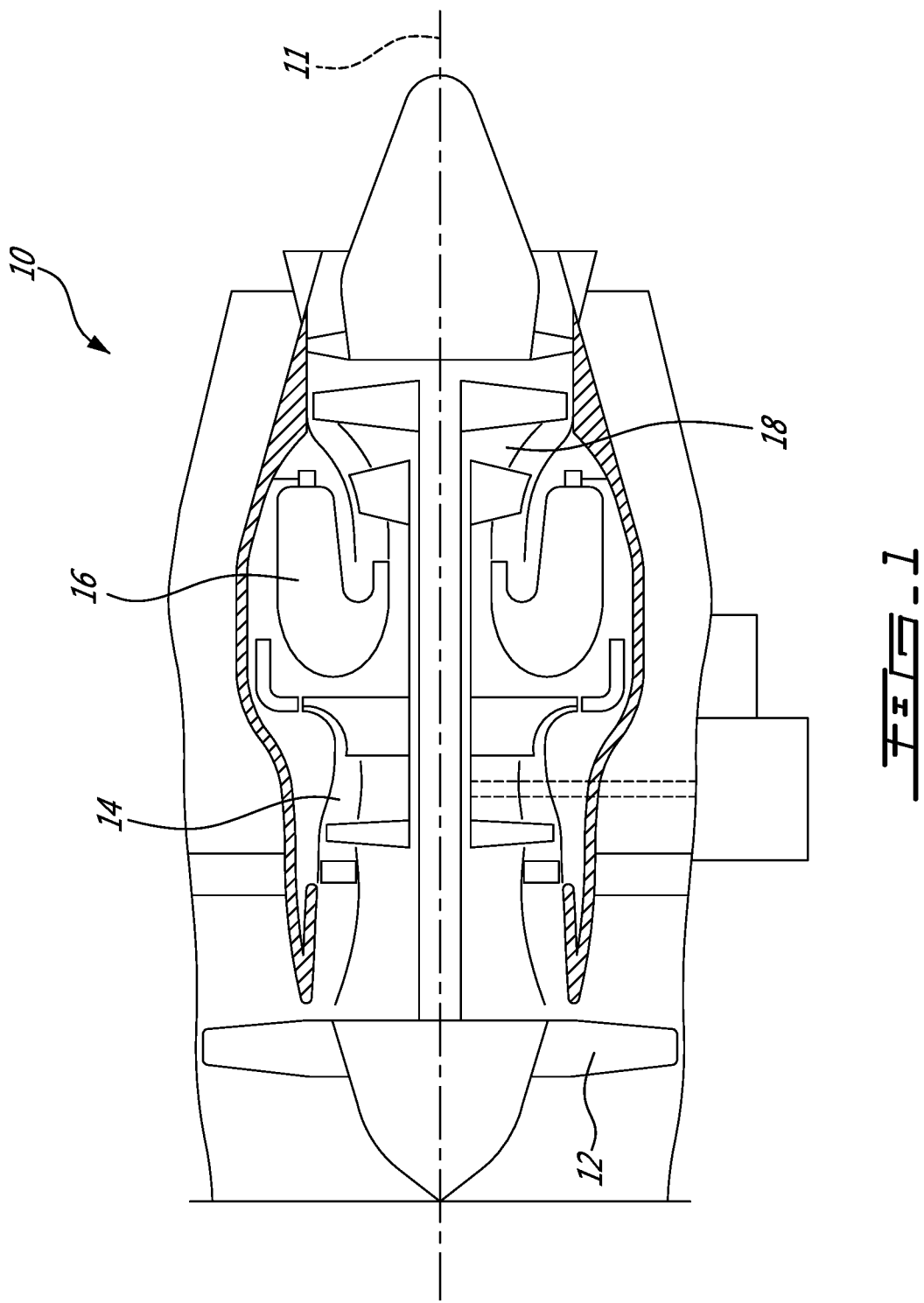
FIG. 1 is a schematic cross-sectional view of a gas turbine engine.

FIG. 1 illustrated a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Gas turbine engines can have components which have complex geometries and which may require two or more processes to manufacture, such as casting and machining for instance. This is the case, for instance, of blades such as fan, compressor or turbine blades. In some embodiments, a preform of the blades is produced by a casting process, but some portions of the blade preform such as the root and/or tip can require machining. There can be a challenge in fixturing the preform of the blade, which can be referred to as a workpiece in this context, during machining or dimensional analysis, and this can particularly be true for smaller components such as blades having less than 20 inches, less than 12 inches, or less than 10 inches in length, for instance. In such cases, for example, it can be preferred to proceed to fixturing via an encapsulation.

In a high production rate environment, it is common for the encapsulations to be cooled before stacking and handling (e.g. transferring to machining station). In some embodiments, for instance, it will be desired to perform dimensional analysis of the encapsulation before stacking, to ensure that it satisfies the tight tolerances. This can require cooling the encapsulation to ambient temperature, such as to avoid thermal growth influencing the measured dimensions. In these or other embodiments, the encapsulations can be stacked on plastic supports, and it can be desired to cool the encapsulation to allow safe handling or simply to avoid burning supports, such as plastic supports, for instance. Cooling may be required for other reasons as well.

Figure 2:
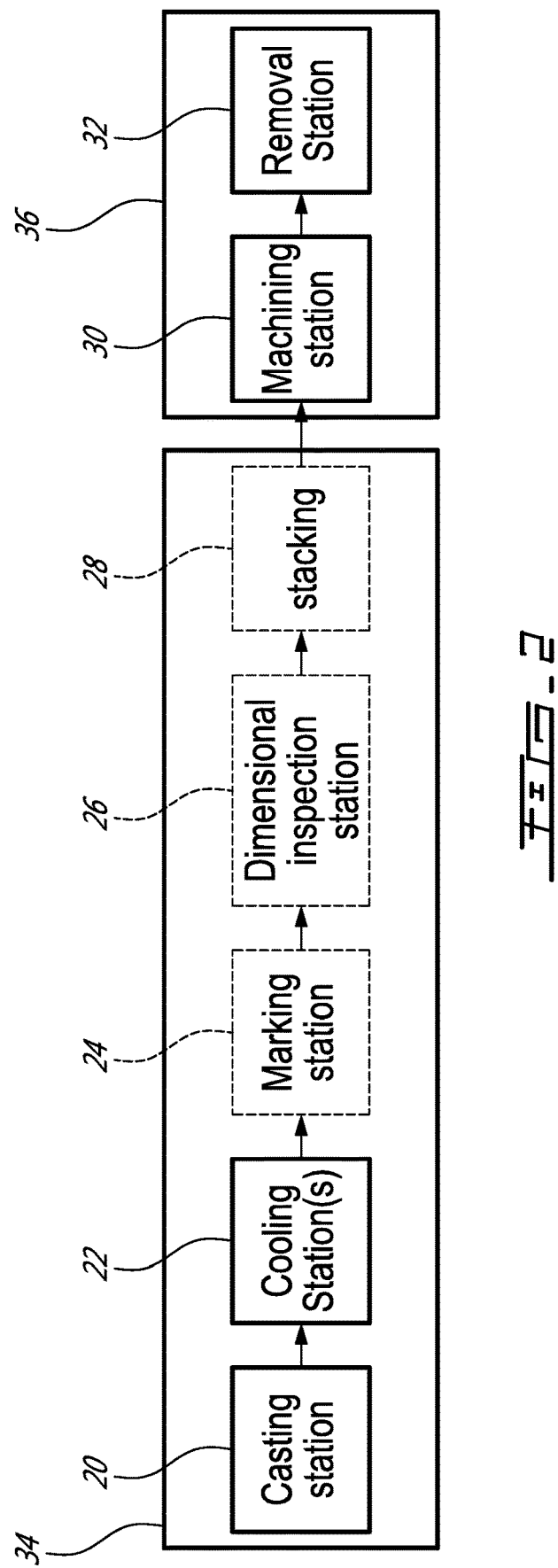
FIG. 2 is a block diagram presenting an example machining workflow.

An example workflow is presented in FIG. 2, which shows an example machining sequence from a casting station 20 where the encapsulation is cast, one or more cooling station 22 where the encapsulation is cooled, a marking station 24 where an identifier can be marked onto the encapsulation, a dimensional inspection station 26 where the encapsulation can be checked to satisfy the tight dimensional tolerances, and placed into a stack 28 if it passes the dimensional check (otherwise, the encapsulation can be broken off from the workpiece and redone). In this example, the stack is taken from a first plant 34 to a second plant 36, and more precisely to a machining station 30 where the machining is performed by fixturing via the encapsulation, and a removal station 32 where the encapsulation is removed from the workpiece. In alternate embodiments, the machining and removal can be performed in the same plant, for instance, and the cooled encapsulation and workpiece can be moved directly to machining without stacking, marking, or dimensional inspection, for instance.

In an industrial production context, production rate can be an important factor on the production cost bottom line, and much effort can be put on the task of alleviating any bottlenecks in the process. To this end, it can be preferred that the cooling station 22 cool the encapsulation within a limited amount of time. For instance, in an embodiment where the encapsulation undergoes dimensional inspection prior to stacking, it can be preferred for the cooling duration to be lower than both the casting duration (20) and the dimensional inspection (26) duration. Other steps, such as marking, can be present as well.

The cooling duration can be affected by two main variables: the amount of heat to be removed dQ, and the rate at which the heat is removed. The amount of heat to be removed dQ can depend on three main variables: the mass of the encapsulation, the thermal capacity of the encapsulation's material (Cp), and the difference in temperature between the initial temperature Ts and the final temperature Tf, and can be presented as follows (using International Units as an example):

$$dQ(kJ) = \text{Mass}(kG) \times cp(kJ/kg\ K) \times [Ts(K) - Tf(K)] \quad (1)$$

In an example of an encapsulation of between 125 and 500 grams is to be cast using zinc or a zinc alloy which has a melting point at 400° C. and a cp of 0.39 kJ/kg*K, and in which dimensional inspection is to be performed at ambient temperature e.g. 20° C., prior to stacking, the difference in temperature can be of 380° C. and the total amount of heat to be removed dQ can be in the order of 10-100 kJ (more specifically between 18.5 and 74 kJ in this specific example). In this same example, it can be required for the cooling process to be completed within a limited amount of time, such as 1 to 2 minutes for example. Taking 1 minute and a dQ of 50 kJ as an example, the cooling would be required to be performed at a cooling rate of at least 50 kJ/min on average during the cooling duration.

The rate of cooling will be affected by the nature of the cooling process and its cooling media, the temperature of the cooling media, and the total surface area of the encapsulation which is exposed to the cooling media. In the example presented above, the total surface area can be between 10 and 250 cm$^2$, more likely above 50 or 70 cm$^2$. A cooling rate in the order of 50 kJ/min can relatively easily be achieved using refrigerated water as the cooling media, and the cooler the water, the quicker the cooling, especially during the last period of cooling, when the temperature of the encapsulation is closer to the temperature of the water. However, it may be preferred to avoid water, and even to avoid using liquids altogether, as a cooling media. Indeed, using water can require to perform an additional step of drying, the complexities, duration, and costs of which may preferably be avoided in some embodiments.

The inconveniences associated with using water, or another liquid cooling media, can, to a certain extent, be alleviated by using pressurized air as the cooling media. This can be counter-intuitive because pressurized air has a lesser thermal capacity than water. Nonetheless, pressurized air can be preferred from the point of view of avoiding the need for an additional step of drying, and/or can be considered easier to obtain and handle than water. Indeed, many factories have a supply of pressurized air readily available.

However, the limited thermal capacity or pressurized air over water can limit the amount of cooling achievable. Accordingly, pressurized air may not be a suitable media to cool an encapsulation in some embodiments. To a certain extent, the weakness of pressurized air can be alleviated by performing the encapsulation cooling process in an enclosure. One possible advantage of performing an encapsulation cooling process with pressurized air impinging against the encapsulation in an enclosure rather than simply in an open space within a factory, is that the pressurized air, in addition to producing direct convection cooling of the encapsulation upon impinging against it, can further be used to maintain air circulation and a limited temperature environment within the enclosure. This can be achieved by directing pressurized air jets in a manner for the pressurized air to maintain a substantial amount of its kinetic energy after encountering the encapsulation the first time, and can be favored by a suitable orientation of the air jet and/or by using an enclosure shape which favors recirculation, such as using rounded corners for instance. It was found that using an enclosure met greater advantages when the size of the enclosure was limited compared to the size of the part. In some embodiments, the advantages offered by using an enclosure began to fade out when the enclosure was more than 40 times the volume of the encapsulation. Another possible inconvenience of pressurized air is that it may not be cool enough to perform the cooling operation with a satisfactory degree of efficiency, and may thus cause an unsatisfactory cooling duration. This latter inconvenience may, to a certain extent, be alleviated by cooling the pressurized air before using it to cool the encapsulation. In one embodiment, this can be achieved by subjecting the pressurized air to a thermal machine, such as a refrigerator or thermal pump for instance, to cool it prior to directing it onto the encapsulation. Another way to cool pressurized air is to use vortex tubes. Indeed, vortex tubes can produce a cooler flow of air at the limited cost of a portion of the pressurized air flow rate. Using vortex tubes can be considered preferable to other ways of cooling the pressurized air in some embodiments, because it can be simple, for instance, to integrate vortex tubes in the pressurized air line than a thermal machine.

Referring to FIG. 5, at least in some embodiments, it was found preferable to cool the encapsulation 40 using one or more vortex tube 42. Vortex tubes 42 can produce a cool air jet 44 (and a hot air jet 46 which is a by-product when cooling is desired) using only pressurized air 48 (the expression "cool" refers here to cooler than the intake temperature of the pressurized air). The basic function of a vortex tube 42 generally involves an elongated pipe 50 with two opposite ends 52, 54, each having a respective one of a hot air outlet 46 and a cool air outlet 44, and a tangential inlet 56, typically located adjacent the cool air outlet 44, and configured in a manner to create a helical, radially external flow 58 in the pipe toward the hot air outlet 46. Since the pressurized air can circulate from the inlet 56 can reach both the hot air outlet 46 and the cool air outlet 44, and air is a fluid, both outlets can be said to be fluidly connected to the inlet 56. A component 62 typically in the form of a conical nozzle and typically adjustable and referred to as a valve is positioned in the center of the hot air outlet 46, allowing an annular stream of hotter air out of the hot air outlet 46, and redirects a radially internal, helical flow 60 of cooler air, back to the cool air outlet 44 along the length of the pipe 50, in a cross-flow configuration relative to the radially external flow 58, and the physics of the flows, combined with the phenomena of viscous dissipation, force heat exchange from the central flow 60 to the external flow 58. Accordingly, the tangential inlet 56 can be said to be proximate the cold air outlet 44 and to be configured to generate a swirling flow propagating radially outward and lengthwise inside the pipe 50 toward the annular hot air outlet 46. The valve 62 is typically adjustable in a manner allow adjusting the relative flow rates between the hot air outlet 46 and the cool air outlet 44, and closing the valve 62 typically produces a higher flow rate through the cool air outlet 44 at a higher temperature, whereas opening the valve 62 typically produces a lower flow rate through the cool air outlet 44 at a lower temperature. The range of adjustment of the valve 62 can be limited within a given range of flow rate and temperature. Helical blades are typically used in the vicinity of the tangential inlet, and in some embodiments, the vortex tubes 42 are configured in a manner to allow a user to select a cartridge 64 bearing a particular configuration of helical blades as a function of a coarse value of the temperature and flow rate range which it is desired to achieve, with fine tuning then being achieved by way of valve 62 adjustment. Cooling of a hotter component is more efficient when tuning the cool air outlet in a manner to produce a higher flow rate of cool air, even at the price of cool air which is not as cool, whereas cooling a component closer to ambient temperature can be more efficiently achieved by tuning in a manner to produce a cooler flow rate, with the trade-off of a lower flow rate. In some embodiments, it can be preferred to use pressurized air directly, without a vortex tube, in a first phase of cooling the encapsulation, and to use a vortex tube in a second, and/or subsequent phase of cooling encapsulation, when the temperature of the encapsulation has dropped below a certain threshold via the first phase of cooling.

Given that they are powered simply by pressurized air, readily available in factories in the form of factory-pressurized air typically having a constant, factory-set pressure (e.g. 80 psi, 100 psi, depending on the factory), vortex tubes 42 typically produce a cool air jet which has a limited heat transfer capacity, and as discussed above, its cooling efficiency typically drops rapidly when it is used to cool a part which is outside the temperature range for which its flow rate and cool flow temperature are tuned to. This can make vortex tubes appear ill-adapted to perform a task such as cooling an encapsulation relatively quickly over a large temperature range. However, it was found that vortex tubes could produce a suitable source of cooling air for cooling encapsulation at least in some embodiments. Moreover, different solutions can be implemented to alleviate the inconveniences of vortex tubes 42, and/or improve the cooling efficiency achievable using vortex tubes, in an encapsulation-cooling context.

A first solution, which can also be useful if using direct pressurized air as a cooling media, can be to enclose the cooling operation, in a manner to contain the cool air and to favor a longer exposure time over the surface area of the encapsulation before evacuating it to the atmospheric or environmental conditions. Indeed, an enclosure 66 can be provided as part of the cooling station, with the cool air outlet(s) 44 penetrating inside the enclosure 66, and means to move the encapsulation into and out of the cooling station. The enclosure 66 can be provided with an internal volume 67 which is sized to receive the encapsulation 40 therein. In some embodiments, the internal volume 67 may be sized within a given range relative to the volume of the encapsulation 40, for instance. The enclosure can be configured in a manner to form a higher pressure environment than its surroundings. The enclosure and the cool air outlet(s) can be configured in a manner to sustain air movement, such as recirculation for instance, around the encapsulation in the enclosure, and can be configured to maintain an average air temperature which, while being higher than the temperature of the air immediately after exiting the cool air outlet, can remain significantly lower than ambient temperature. Such techniques can increase the cooling rate compared to a scenario where a same vortex tube is used on an unenclosed encapsulation directly in a factory environment, where the cool air jet is allowed to dissipate into the environing area (i.e. an area immediately surrounding the encapsulation, within the plant or factory) immediately after impinging onto the encapsulation, for instance. It will also be noted that vortex tubes can produce a lot of sound, which can be undesirable in a factory environment, and the enclosure can further be provided with acoustic insulation to alleviate the latter inconvenience.

A second solution, which can be used independently of, or combined with, the first solution, is to change the temperature and the flow rate of the cool air outlet(s) 44 during the cooling operation. A first example way to achieve this is by using more than one cooling station 66 in sequence, with each cooling station corresponding to a given temperature range, and to furbish each cooling station 66 with one or more vortex tube(s) 42 which are tuned to the respective temperature range. A second example way to achieve this can be achieved with only a single vortex tube 42, by tuning the one or more vortex tube 42 over time, in a manner to produce a progressively, or abruptly, cooler, lower flow rate, flow as the temperature of the encapsulation drops. In embodiments where more than one enclosure 66 with correspondingly tuned vortex tubes 42 are provided, the volume of the enclosure 66 relative to the volume of the encapsulation can vary, such as by providing a progressively lower enclosure volume as the flow rate and cool air flow temperature progressively reduces. The tuning of the vortex tube(s) can be performed automatically or manually based on the temperature of the encapsulation, which can be obtained in real-time, or, if the temperature evolution of the encapsulation in the cooling process is known, such as via prior calibration, the tuning can be performed solely as a function of time elapsed, such as based on a timer, to name another example.

Embodiments will now be detailed to provide tangible examples of how such solutions can be alternately embodied depending on the specificities of a given situation.

Figure 3:
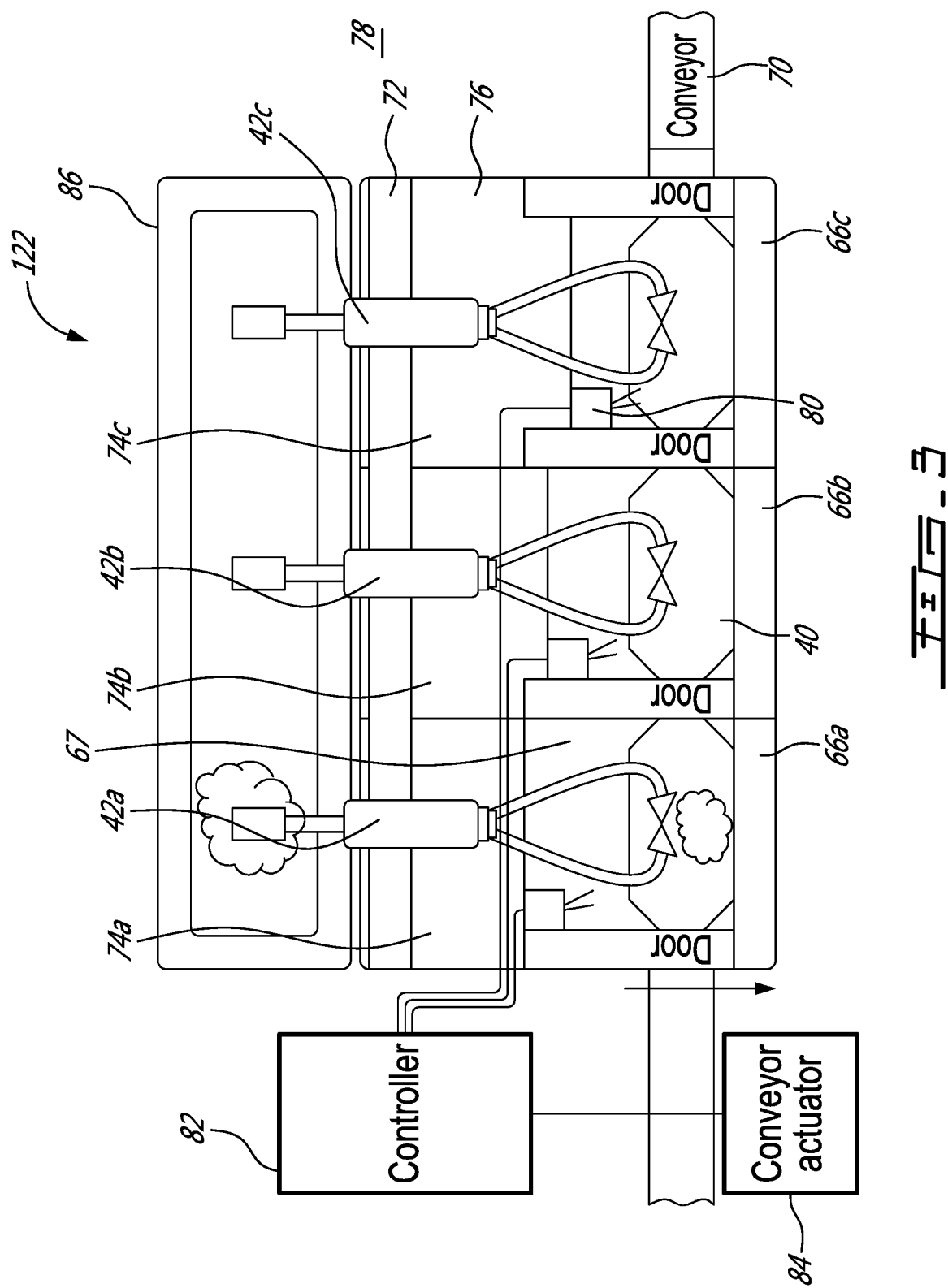
FIG. 3 is a cross-sectional view of an example cooling station.

FIG. 3 presents a first embodiment of an encapsulation cooling process which is based on the use of vortex tubes 42a, 42b, 42c. In this example, the cooling station 122 includes, in fact, a sequence of three cooling areas 74a, 74b, 74c, each having a corresponding enclosure 66a, 66b, 66c, and a corresponding vortex tube 42a, 42b, 42c. A conveyor 70 is provided to convey the encapsulation 40 from one enclosure to another, and more than one enclosure can be loaded with an encapsulation 40 at any given time. In one mode of operation, all enclosures are simultaneously loaded in a manner for the bottleneck of the cooling process to be reduced to only a portion of the cooling operation. Each cooling area 74a, 74b, 74c is configured in a manner to have a corresponding start temperature and finish temperature, corresponding to a respective segment of the total cooling cycle. Accordingly, the encapsulation can be cooled in sequence in distinct first and second enclosures 66a, 66b, with the workpiece being moved from the first enclosure 66a to the second enclosure 66b to be cooled at a second air temperature after cooling at the first air temperature in the first enclosure 66a is completed, and so forth if one or more additional enclosures are used.

More specifically, the vortex tubes can be model 20010 stainless steel vortex tubes manufactured by the company AiRTX, and the encapsulations 40 can be of 158 grams of zinc exiting the casting station 20 at roughly 400° C. The pressurized air source can be an 80 psi factory source shared between all three vortex tubes 42a, 42b, 42c via a suitable manifold 72. The first cooling area 74a can be designed to sustain, within its enclosure 66a, an average temperature of 150°, with a cooling air jet tuned to be between 15 and 20° C. for instance, to bring the encapsulation from 400° C. to 180° C. or the like. Alternately, the first cooling area 74a can use factory-compressed air directly as the cooling media, without using a vortex tube. The second cooling station 74b can be designed to sustain an average temperature of 35° C., with a cooling air jet tuned to be between 10 and 15° C., to bring the encapsulation from 180° C. to 50° C. or the like. The third cooling station 74c can be designed to sustain an average temperature of 17° C., with a cooling air jet tuned to be between 5 and 10° C., to bring the encapsulation from 50° C. to 20° C. Accordingly, the flow rate of the cooling air jets will progressively diminish from the first cooling station 74a to the third cooling station 74c, such as from 6-7 ft$^3$/min, to 2 ft$^3$/min, to 0.5 ft$^3$/min, for instance. The relative volume of the enclosures can progressively reduce as well, which can be based on the reduction in flow rate. For instance, the first enclosure 66a can have a volume of between 20 and 40 times the volume of the encapsulation 40, the second enclosure 66b can have a volume of between 5 and 15 times the volume of the encapsulation 40, and the third enclosure 66c can have a volume of between 2 and 5 times the volume of the encapsulation 40. The enclosures 66a, 66b, 66c can have rounded internal edges and corners to favor recirculation, and the jets can be oriented somewhat parallel to a main surface of the encapsulation 40, in a manner to preserve kinetic energy, and further oriented relative to the enclosure's geometry in a manner configured to sustain a swirling flow or vortex within the enclosure. Acoustic insulation 76 can be provided to the enclosures 66a, 66b, 66c to provide an acoustic barrier between the cooling process and the environing area 78.

In one possible mode of operation, the temperature of the encapsulation in the third cooling station 66c can be measured in real time, and the conveyor 70 can be controlled in a manner to evacuate the encapsulation from the third cooling station 66c when a target temperature is reached. This process can be performed manually, or can be partially or fully automated. For instance, an infrared temperature sensor 80 can be positioned in a manner to read the temperature of the encapsulation 40 in the third enclosure 66c, generate a signal, which may be digital or analog for example, and may be indicative of this temperature. The sensor 80 may send this digital signal to some form or another of controller 82, such as a programmable logic controller (PLC), or a computer, for instance, which can control an actuator 84 of the conveyor 70 based on predetermined logic and on the temperature signal, for instance, all selected to provide for the functionality described herein. Since the controller 82 receives the temperature and controls the operation of the actuator 84, the controller 82 can be said to be operatively connected to the temperature sensor 80, and operatively connected to the actuator 84. The actuator 84 can be any suitable form of actuator 84, and can be configured to operate while the system is in function. In another mode of operation, digital temperature sensors can be provided in each one of the cooling stations, and can be used to monitor and/or control the process. Each enclosure can have one or more outlet sized and configured in a manner to sustain a positive pressure environment inside the enclosure. The outlets can evacuate the cooling air to the environing area within the production plant, or can convey the cooling air, via a conduit, to be evacuated to the atmosphere.

It will be understood that while the cool air outlet 44 of the vortex tubes 42 produces a jet of cooling air cooler than the intake pressurized air 48 temperature, the hot air outlet 46 produces hot air hotter than the intake pressurized air 48 temperature. Depending on the embodiment, it can be preferred to provide an additional enclosure or hot air conduit 86 to collect the hot air generated by the process and evacuate it to the environing area 78 (inside the plant or building) or to the atmosphere (outside the plant or building). In other words, the hot air outlet 46 can be fluidly connected to the hot air conduit 86, and the hot air conduit can be fluidly connected to the atmosphere. In an alternate embodiment, all the cooling areas 74a, 74b, 74c can be enclosed within a common enclosure, for instance, or be unenclosed, to name another example.

Referring now to FIG. 4, an example of a conveyor 70 which can be used in the system of FIG. 3, and an example mode of operation, will now be presented. In this example, the conveyor 70 is subdivided in a plurality of areas—more specifically 8 in this case. Stations, such as cooling areas 74a, 74b, 74c, can be associated to corresponding ones of the subdivisions, and the encapsulation 40 can be moved from one station to the next by advancing the conveyor 70 in a manner that each area advances to the former position of the preceding area, and so forth. One of the areas 88 can be a receiving area used as a load station. The load station can be within arm's reach (e.g. within about 2 meters) of a casting station 20 (such as an ENCAP™ casting station), for instance, and an operator can manually grab the encapsulation 40, or more specifically the encapsulated workpiece 90, and move the encapsulation 40 and its workpiece 90 onto the load station 88 of the conveyor 70. In this embodiment, the marking station 24 is provided with an electronic marking head 25. In alternate embodiments, the loading process can be automated. In an alternate embodiment, the conveyor can be a turntable, for example.

In one example mode of operation, from the load station, the conveyor 70 can be advanced to bring the encapsulation 40 to the first cooling station 74a. At this point, a second encapsulation and workpiece can be positioned on the load station 88. After a given amount of cooling has been achieved (e.g. a given amount of time has elapsed), the conveyor 70 can be rotated again to move the first part to the second cooling station 74b, and the second part to the first cooling station 74a, and another part can be loaded. This process can continue until the first part reaches a marking station 24, and then a delivery area 92 which can be used as an unloading station, for instance. Similarly to the loading operation, the unloading operation can be performed manually by a user, or be partially or fully automated. The encapsulation and its workpiece can be unloaded to a dimensional inspection station 26 for instance, where it can be measured to determine if it fits within the tight dimensional tolerances specified. If it does, it can proceed to be stacked. If not, the encapsulation can be broken off the workpiece and the workpiece can be returned to the casting station 20. In an alternate embodiment, the conveyor can be a longitudinal conveyor, for instance.

Referring now to FIG. 5, an alternate embodiment will now be detailed. In this alternate embodiment, an actuator 94 is operatively connected to the valve at the hot end 52 of the vortex tube 42. The actuator may be any conventional actuator for instance. A temperature sensor 96 is provided in a manner to read the temperature of the encapsulation 40 during the cooling process. In a preferred embodiment, the temperature sensor 96 is operated to output one or more temperatures of the encapsulation continuously or at a rate of least once per few seconds for example. The temperature sensor 96 may be any temperature sensor, such as conventional one or more temperature sensors, selected to suit each particular embodiment of the present technology and to provide the functionality as described herein. The encapsulation 40 can be of between 125 and 500 grams of zinc or a zinc alloy, and may need to be cooled from 400° C. to below 50° C. prior to stacking. In accordance with a predetermined logic, the actuator 94 can move the valve 62 from the minimum amount of annular hot air outlet area at the beginning of the cooling process, when the temperature of the encapsulation is around 400° C., to a greater and greater amount of annular hot air outlet area as the temperature of the encapsulation diminishes toward the target 50° C. This can be performed in a manner to, continuously or by steps, reduce the flow rate and temperature at the cool air outlet to maintain a suitable cooling efficiency throughout the entire cooling envelope. The temperature sensor 96 can be any suitable temperature sensor and can produce a digital signal, for instance, which can be received by any suitable form of controller 82. The controller 98 can be provided with logic adapted to the function of adapting the position of the valve 62 as a function of the temperature of the encapsulation 40. In an alternate embodiment, the control of the valve can be performed manually.

FIGS. 6 and 7 present yet another embodiment. In this alternate embodiment, a cooling station 222 is provided with a single enclosure 266, but with three different vortex tubes 242a, 242b, 242c directed to three different cooling areas. In this alternate embodiment, only one encapsulation enters the enclosure at any given time. It is first moved to the position corresponding to the first vortex tube 242a, which is tuned to a greater flowrate, warmer flow configuration. After a given amount of time has elapsed, it is moved to the position corresponding to the second vortex tube 242b, which is tuned to an intermediary flow rate, intermediate flow temperature configuration. After another given amount of time has elapsed, it is moved to the third position, where the third vortex tube 242c is tuned to a third flow rate, coolest temperature configuration. After another given amount of time has elapsed, it exits the enclosure, and another encapsulation can be brought into the enclosure. Depending on the application, all three vortex tubes 242a, 242b, 242c can be connected to the same manifold and remain in operation independently of the position of the encapsulation. However, in another embodiment, it can be preferred to connect each vortex tube to the manifold via a corresponding shutoff valve which can selectively be closed or open, manually or in an automated manner. A controller can be provided to selectively open one of the valves and close the two others depending on the position of the encapsulation in the enclosure, for instance. In the illustrated embodiment, the enclosure is provided in the form of a plastic case 202, and acoustic insulation 204 is provided around the inner wall surface of the plastic case 202. The plastic case is in two halves. In FIG. 6, the first half has been removed to show the inside.

It will be understood that the expression "computer" as used herein is not to be interpreted in a limiting manner. It is rather used in a broad sense to generally refer to the combination of some form of one or more processing units and some form memory system accessible by the processing unit(s). The use of the expression "computer" in its singular form as used herein includes within its scope the combination of a two or more computers working collaboratively to perform a given function. Moreover, the expression "computer" as used herein includes within its scope the use of partial capacities of a processing unit of an elaborate computing system also adapted to perform other functions. Similarly, the expression "controller" as used herein is not to be interpreted in a limiting manner but rather in a general sense of a device, or of a system having more than one device, performing the function(s) of controlling one or more device such as an electronic device or an actuator for instance, independently of whether or not the "controller" is also a "computer".

It will be understood that the various functions of a computer or of a controller can be performed by hardware or by a combination of both hardware and software. For example, hardware can include logic gates included as part of a silicon chip of the processor. Software can be in the form of data such as computer-readable instructions stored in the memory system. With respect to a computer, a controller, or a processing unit, the expression "configured to" relates to the presence of hardware or a combination of hardware and software which is operable to perform the associated functions.

FIG. 8 presents an example process of encapsulating a workpiece. The example process includes positioning at least a portion of a workpiece in a mold 310, pouring a metal in liquid state into the mold, and solidifying the metal into an encapsulation, the encapsulation encapsulating the workpiece 312, removing the encapsulation and workpiece from the mold 314, cooling the encapsulation using cooling air at a first air temperature and a first flow rate from a vortex tube 316, and cooling the encapsulation using cooling air at a second air temperature and a second flow rate from said vortex tube 318, the second air temperature and the second flow rate being lower than the first air temperature and the first flow rate, respectively.

FIG. 9 presents another example process of encapsulating a workpiece. The example process includes positioning at least a portion of a workpiece in a mold 410, pouring a metal in liquid state into the mold, and solidifying the metal to create an encapsulation encapsulating the workpiece 412, removing the encapsulation and the workpiece from the mold 414, cooling the encapsulation using cooling air from a vortex tube, including include enclosing the cooling air and the encapsulation in a volume having less than 40 times a volume of the encapsulation 416.

The embodiments described in this document provide non-limiting examples of possible implementations of the present technology. Upon review of the present disclosure, a person of ordinary skill in the art will recognize that changes may be made to the embodiments described herein without departing from the scope of the present technology. For instance, it has been found by the creators of the present technology that executing the cooling of one or more encapsulations within one or more enclosures, such as the enclosures 66 and 66a-66c described above, provides material advantages in some applications. However, it will be noted that the present technology may be practiced without the use of an enclosure while still providing at least some advantages vis-à-vis prior methods in the present domain. As another example, it has been found by the creators of the present technology that executing modulation of cooling airflow and temperature as described herein may be preferred and may provide material advantages in some applications. However, the present technology may be practiced without such modulation while still providing at least some advantages vis-à-vis prior methods in the present domain. For example, in some embodiments, the cooling air temperature may be maintained constant throughout the cooling of a given encapsulation. As still another example, it is contemplated that air may be optionally cooled via a suitable thermal machine, such as a conventional thermal machine executing a refrigeration cycle, prior to the air being fed into the vortex tube(s). Yet further modifications could be implemented by a person of ordinary skill in the art in view of the present disclosure, which modifications would be within the scope of the present technology.

The invention claimed is:

1. A system for encapsulating a workpiece, the system comprising:
   a casting station configured to cast an encapsulation around a workpiece;
   a cooling station having an enclosure configured to receive the encapsulation and workpiece, the enclosure including a first enclosure and a second enclosure; and
   a vortex tube having a pressurized air inlet, a cool air outlet fluidly connected to the pressurized air inlet, and a hot air outlet fluidly connected to the pressurized air inlet, the cool air outlet being fluidly connected to the enclosure,
   wherein the vortex tube includes a first vortex tube and a second vortex tube each having an inwardly facing cone blocking a central area within the hot air outlet, the inwardly facing cone is at a first position relative the hot air outlet when the encapsulation is at a first temperature, the first position causing temperature of air exiting the cool air outlet to be at a higher temperature and at a higher flow rate, and the inwardly facing cone is at a second position relative the hot air outlet when the encapsulation is at a second temperature, the second position causing the temperature of air exiting the cool air outlet to be at a lower temperature and a lower flow rate, the higher temperature being higher than the lower temperature, the higher flow rate being higher than the lower flow rate,
   the cool air outlet of the first vortex tube is fluidly connected to the first enclosure, the inwardly facing cone of the first vortex tube being at said first position;
   the cool air outlet of the second vortex tube is fluidly connected to the second enclosure, the inwardly facing cone of the second vortex tube being at said second position,
   wherein the first enclosure has a larger internal volume than the second enclosure, both the first enclosure and the second enclosure having a volume of less than 40 times a volume of the encapsulation.

2. The system of claim 1, further comprising a conveyor having a receiving area configured to receive the encapsulation and the workpiece from the casting station, a delivery area, and conveyance path extending from the receiving area to the delivery area via the first enclosure and the second enclosure.

3. The system of claim 2, further comprising a temperature sensor configured to generate a temperature signal indicative of a temperature of the workpiece, and a controller operatively connected to the temperature sensor and configured to control the conveyor based on the temperature signal.

4. The system of claim 1, further comprising an actuator operatively connected to the vortex tube to be operable to modulate a temperature and flow rate of air exiting the cool air outlet during operation of the system.

5. The system of claim 4, further comprising a temperature sensor configured to generate a temperature signal indicative of a temperature of the workpiece, and a controller configured to control the actuator based on the temperature signal.

6. The system of claim 1, wherein the enclosure has acoustic insulation around an internal volume sized to receive the encapsulation.

7. The system of claim 1, wherein the vortex tube includes an elongated pipe having an annular hot air outlet at a first end, a cold air outlet at a second end, and a tangential inlet proximate the cold air outlet configured to generate a swirling flow propagating radially outward and lengthwise inside the pipe toward the annular hot air outlet.

8. The system of claim 7, wherein the vortex tube includes an inwardly facing cone blocking a central area of the first end, within the annular hot air outlet, said cone configured to redirect a portion of the swirling flow radially inwardly and lengthwise inside the elongated tube back toward the cold air outlet.

9. The system of claim 1, wherein the casting station is within 2 meters of the cooling station.

10. The system of claim 1, further comprising a dimensional inspection station within 2 meters of the cooling station.

11. The system of claim 10, wherein the dimensional inspection station is a coordinate measuring machine (CMM) configured to perform dimensional analysis of the encapsulation at ambient temperature.

12. The system of claim 1, further comprising a hot air conduit, the hot air outlet of each vortex tube being fluidly connected to the hot air conduit, the hot air conduit being acoustically insulated from an environing area.

13. The system of claim 1 wherein the enclosure has a volume of less than 40 times a volume of the encapsulation.

14. The system of claim 1 wherein the system further comprises a temperature sensor disposed for sensing a temperature of the encapsulation, an actuator configured for moving one of said at least one cone, and a controller, the controller being connected to the temperature sensor and to the actuator and configured to move the cone between the first position and the second position based on the temperature of the encapsulation.

15. A system for encapsulating a workpiece, the system comprising:
   a casting station configured to cast an encapsulation around a workpiece;
   a cooling station having an enclosure configured to receive the encapsulation and workpiece; and
   a vortex tube having a pressurized air inlet, a cool air outlet fluidly connected to the pressurized air inlet, and a hot air outlet fluidly connected to the pressurized air inlet, the cool air outlet being fluidly connected to the enclosure;

wherein the cooling station is configured in a manner for the temperature of air exiting the cool air outlet to be at a higher temperature and at a higher flow rate when the encapsulation is at a first temperature, and to be at a lower temperature and a lower flow rate when the encapsulation is at a second temperature, the higher temperature being higher than the lower temperature, the higher flow rate being higher than the lower flow rate;

wherein:
  the enclosure is a plurality of enclosures including a first enclosure and a second enclosure;
  the vortex tube is a plurality of vortex tubes including a first vortex tube and a second vortex tube;
  the cool air outlet of the first vortex tube is fluidly connected to the first enclosure and is tuned to said higher temperature and said higher flow rate;
  the cool air outlet of the second vortex tube is fluidly connected to the second enclosure and is tuned to said lower temperature and said lower flow rate; and
  wherein the first enclosure has a larger internal volume than the second enclosure, both the first enclosure and the second enclosure having a volume of less than 40 times a volume of the encapsulation.

* * * * *